(12) United States Patent
Goossens et al.

(10) Patent No.: US 12,533,834 B2
(45) Date of Patent: Jan. 27, 2026

(54) METHODS FOR FORMING FOAMED BEADS INCLUDING A NANOSTRUCTURED FLUOROPOLYMER

(71) Applicant: SHPP GLOBAL TECHNOLOGIES B.V., Bergen op Zoom (NL)

(72) Inventors: Johannes Gerardus Petrus Goossens, Bergen op Zoom (NL); Vaidyanath Ramakrishnan, Bergen op Zoom (NL); Johannes Martinus Dina Goossens, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 639 days.

(21) Appl. No.: 17/785,480

(22) PCT Filed: Dec. 18, 2020

(86) PCT No.: PCT/IB2020/062225
§ 371 (c)(1),
(2) Date: Jun. 15, 2022

(87) PCT Pub. No.: WO2021/124278
PCT Pub. Date: Jun. 24, 2021

(65) Prior Publication Data
US 2023/0020844 A1    Jan. 19, 2023

(30) Foreign Application Priority Data
Dec. 20, 2019 (EP) ................................. 19219125

(51) Int. Cl.
*B29C 44/34* (2006.01)
*C08J 9/00* (2006.01)
(Continued)

(52) U.S. Cl.
CPC ...... *B29C 44/3446* (2013.01); *B29C 44/3461* (2013.01); *C08J 9/0061* (2013.01);
(Continued)

(58) Field of Classification Search
CPC ............ B29C 44/3446; B29C 44/3461; B29C 44/3453; C08J 9/0061; C08J 9/18;
(Continued)

(56) References Cited

U.S. PATENT DOCUMENTS 4,154,775 A    5/1979 Axelrod
5,314,925 A    5/1994 Burnell et al.
(Continued)

FOREIGN PATENT DOCUMENTS

CN    103282417 A    9/2013
CN    107207847 A    9/2017
(Continued)

OTHER PUBLICATIONS

Zhao, J. et al. Materials and Design vol. 131, 2017, pp. 1-11.
(Continued)

*Primary Examiner* — K. Boyle
(74) *Attorney, Agent, or Firm* — Quicker Law, LLC

(57) ABSTRACT

A method for forming foamed beads includes: saturating pellets with a blowing agent to form saturated pellets; and depressurizing the saturated pellets in a pressure vessel to form the foamed beads. The pellets include: a matrix polymer component, and from 0.01 wt % to 2 wt %, based on the weight of the pellets, of a nanostructured fluoropolymer, a nanostructured fluoropolymer encapsulated by an encapsulating polymer, or a combination thereof.

8 Claims, 13 Drawing Sheets

(51) Int. Cl.
  *C08J 9/18*    (2006.01)
  *C08J 9/228*   (2006.01)
  *C08J 9/232*   (2006.01)
  *B29K 27/18*   (2006.01)
  *B29K 67/00*   (2006.01)
  *B29K 79/00*   (2006.01)

(52) U.S. Cl.
  CPC .............. *C08J 9/18* (2013.01); *C08J 9/228* (2013.01); *B29K 2027/18* (2013.01); *B29K 2067/003* (2013.01); *B29K 2079/085* (2013.01); *C08J 2367/03* (2013.01); *C08J 2379/08* (2013.01); *C08J 2427/18* (2013.01)

(58) Field of Classification Search
  CPC .... C08J 9/228; C08J 2367/03; C08J 2379/08; C08J 2427/18; C08J 2205/044; C08J 2367/04; C08J 9/0038; C08J 2423/28; C08J 2427/04; C08J 2479/08; C08J 2427/12; B29K 2027/18; B29K 2067/003; B29K 2079/085
  See application file for complete search history.

(56) References Cited

U.S. PATENT DOCUMENTS

| | | | |
|---|---|---|---|
| 5,830,923 A | 11/1998 | Venkataraman | |
| 6,527,993 B1 * | 3/2003 | Hirai | B29C 44/3415 |
| | | | 264/55 |
| 2011/0064938 A1 | 3/2011 | Briendel et al. | |
| 2016/0039990 A1 | 2/2016 | Park et al. | |
| 2017/0327676 A1 | 11/2017 | Sun et al. | |
| 2018/0057653 A1 | 3/2018 | Ramakrishnan et al. | |
| 2018/0118899 A1 * | 5/2018 | Ramakrishnan | C08G 59/70 |
| 2019/0203011 A1 | 7/2019 | Sun et al. | |
| 2019/0210250 A1 | 7/2019 | Park et al. | |
| 2019/0338098 A1 | 11/2019 | Ramakrishnan et al. | |

FOREIGN PATENT DOCUMENTS

| | | | | |
|---|---|---|---|---|
| CN | 107531983 A | | 1/2018 | |
| CN | 108250734 A | | 7/2018 | |
| CN | 109251412 A1 | | 1/2019 | |
| EP | 0373402 A2 | * | 6/1990 | |
| EP | 2629039 A1 | | 8/2013 | |
| EP | 3808802 A1 | | 4/2021 | |
| JP | H10-180787 A | | 7/1998 | |
| JP | 2002-275297 A | | 9/2002 | |
| JP | 2003-113265 A | | 4/2003 | |
| JP | 2003-113322 A | | 4/2003 | |
| JP | 2017179212 A | * | 10/2017 | ............... C08J 9/18 |
| WO | 2005/098101 A1 | | 10/2005 | |
| WO | 2006/094163 A1 | | 9/2006 | |
| WO | 2016/082210 A1 | | 6/2016 | |
| WO | 2016/149400 A1 | | 9/2016 | |
| WO | 2018/122747 A1 | | 7/2018 | |

OTHER PUBLICATIONS

Jiang, R. et al. Polymers vol. 11, No. 12, 2019, p. 1983.
Huang et al. Polymers, vol. 134, No. 3, Jan. 2018, pp. 263-274 (Abstract only).
Wang, K. et al. Journal of Applied Polymer Sciences, vol. 129, No. 4, Aug. 15, 2013, pp. 2253-2260 (abstract only).
Jurczuk, K. et al. European Polymer Journal, vol. 88, Mar. 2017, pp. 171-182. (abstract only).
Wang, K. et al. Journal of Supercritical Fluids, vol. 110, Apr. 2016, pp. 65-74. (abstract only).
Wang, G. et al. Chemical Engineering Journal, vol. 350, Oct. 15, 2018, pp. 1-11 (abstract only).
Rizvi, A. et al. Macromolecules vol. 52, No. 17, Aug. 21, 2019, pp. 6467-6473 (abstract only).
International Search Report and Written Opinion mailed Mar. 19, 2021 in PCT/IB2020/062230 (11 pgs.).
International Search Report and Written Opinion mailed Mar. 17, 2021 in PCT/IB2020/062225 (8 pgs.).
Hseih, D. et al. "Miscibility and immiscibility in functionalized associating polymer systems: polystyrene-poly(phenylene oxide) blends", Polymer, vol. 33, No. 6, 1992, pp. 1210-1217.

* cited by examiner

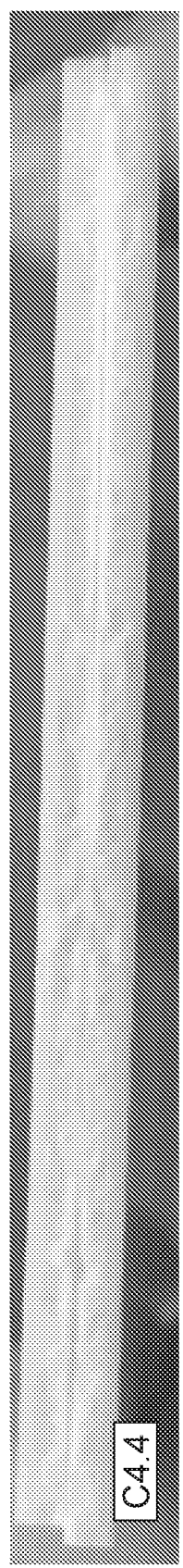
FIG. 6B
FIG. 6C
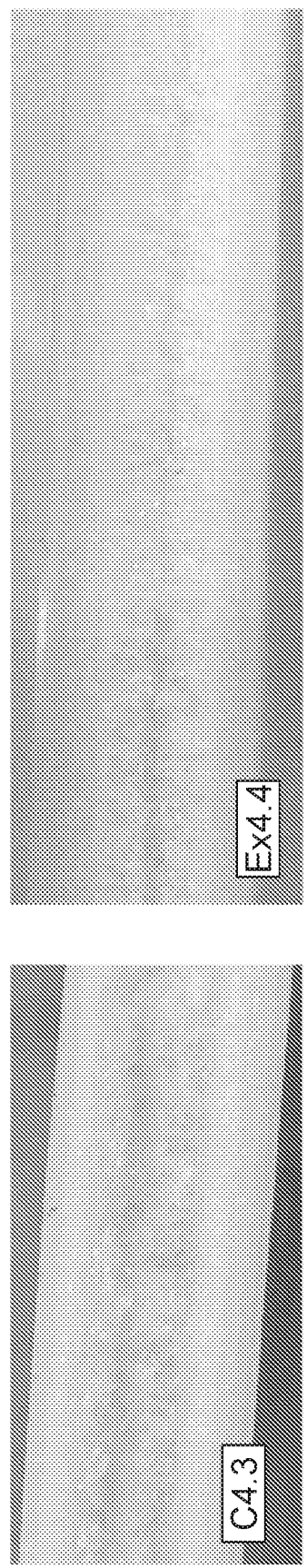
FIG. 6D

METHODS FOR FORMING FOAMED BEADS INCLUDING A NANOSTRUCTURED FLUOROPOLYMER

CROSS-REFERENCE TO RELATED APPLICATION

This application is the National Stage of International Application No. PCT/IB2020/062225 filed Dec. 18, 2020, which claims the benefit of European Application No. 19219125.2 filed Dec. 20, 2019, the disclosures of which are incorporated herein by this reference in their entireties.

FIELD OF THE DISCLOSURE

The present disclosure relates to methods for forming foamed beads, and in particular to foamed beads including a nanostructured fluoropolymer.

BACKGROUND OF THE DISCLOSURE

For a number of polymer processing methods a certain melt strength is required. This can be achieved by tailoring the molecular weight distribution and the molecular architecture, such as by introducing branches. A drawback of this approach is that for each resin specific chemistries need to be developed, which may not be economically attractive. Another method is to use an anisotropic (nano) additive with a high aspect ratio. It has been demonstrated that by using polytetrafluoroethylene (PTFE) the melt strength of several resins can be increased. The efficiency of these additives is a relevant characteristic from a technological and economic point of view.

Polymer processing methods that are known to benefit from an increased melt strength are foaming, melt impregnation of carbon and glass fibers (short, long and continuous), film blow molding, thermoforming, film extrusion with (un) filled resins. Numerous processes exist to make polymeric foams: extrusion foaming, foam injection molding, bead foaming and batch foaming. In each of these processes either chemical or physical blowing agents can be used. Examples of physical blowing agents include nitrogen, carbon dioxide and hydrocarbons (e.g., pentane, isopentane, cyclopentane). Chemical blowing agents include isocyanate and water for polyurethane, azodicarbonamide for vinyl, hydrazine and other nitrogen-based materials for thermoplastic and elastomeric foams, and sodium bicarbonate for thermoplastic foams. Gaseous products and other byproducts are formed by a chemical reaction of the chemical blowing agent, promoted by the heat of the foam production process or a reacting polymer's exothermic heat. In addition, mixtures of chemical/physical blowing agents might be used.

In each of these foaming processes several steps exist to control the cell size distribution and the properties of such foamed products, i.e., nucleation of the cells, expansion of the cells and fixation of the foam structure. This can lead to open-cell or closed-cell foams.

Next to the foam nucleation step, a very important parameter in the foaming processes, such as bead foaming processes, is the melt strength of the materials to control and stabilize the expansion of the foam, thereby controlling the final density and properties of the foam. The melt strength can be improved by introducing branches on the polymer backbone as done for, e.g., low density polyethylene (LDPE), branched polypropylene (PP) or polyethylene terephthalate (PET) by using specific chain extender/branching agents, or by using specific additives with a certain aspect ratio higher than 1. The dispersion/distribution of these fillers is important.

Depending on the selected method of making the foam, different resins with a range of additives need to be used/optimized and the processing parameters need to be optimized. A universal approach is still desirable.

These and other shortcomings are addressed by aspects of the disclosure

SUMMARY

Aspects of the disclosure relate to methods for forming foamed beads including: saturating pellets with a blowing agent to form saturated pellets; and depressurizing the saturated pellets in a pressure vessel to form the foamed beads. The pellets include: a matrix polymer component, and from 0.01 wt % to 2 wt %, based on the weight of the pellets, of a nanostructured fluoropolymer, a nanostructured fluoropolymer encapsulated by an encapsulating polymer, or a combination thereof.

In further aspects saturating the pellets with a blowing agent includes applying, by the pressure vessel, at least one of heat and pressure to the pellets to form the saturated pellets, and depressurizing the saturated pellets in a pressure vessel to form the foamed beads includes depressurizing the saturated pellets and heat treating the saturated pellets in a hot liquid bath, wherein, during forming the foamed beads, the blowing agent induces nucleation and expansion in the saturated pellets to form the foamed beads.

In specific aspects the matrix polymer component includes polybutylene terephthalate (PBT), polyetherimide (PEI), polyethylene terephthalate (PET), polycarbonate (PC), poly(p-phenylene oxide) (PPO), polystyrene (PS), polyphenylene sulfide (PPS), polypropylene (PP), polyamide (PA), linear low-density polyethylene (LLDPE), low-density polyethylene (LDPE), high density polyethylene (HDPE), polytrimethylene terephthalate (PTT), polyethylene naphthalate (PEN), polybutylene naphthalate (PBN), copolymers thereof, or a combination thereof.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIGS. 6A-6D are images of comparative polybutylene terephthalate (PBT) compositions and example PBT polymer compositions formed according to aspects of the disclosure.

DETAILED DESCRIPTION

Figure 1:
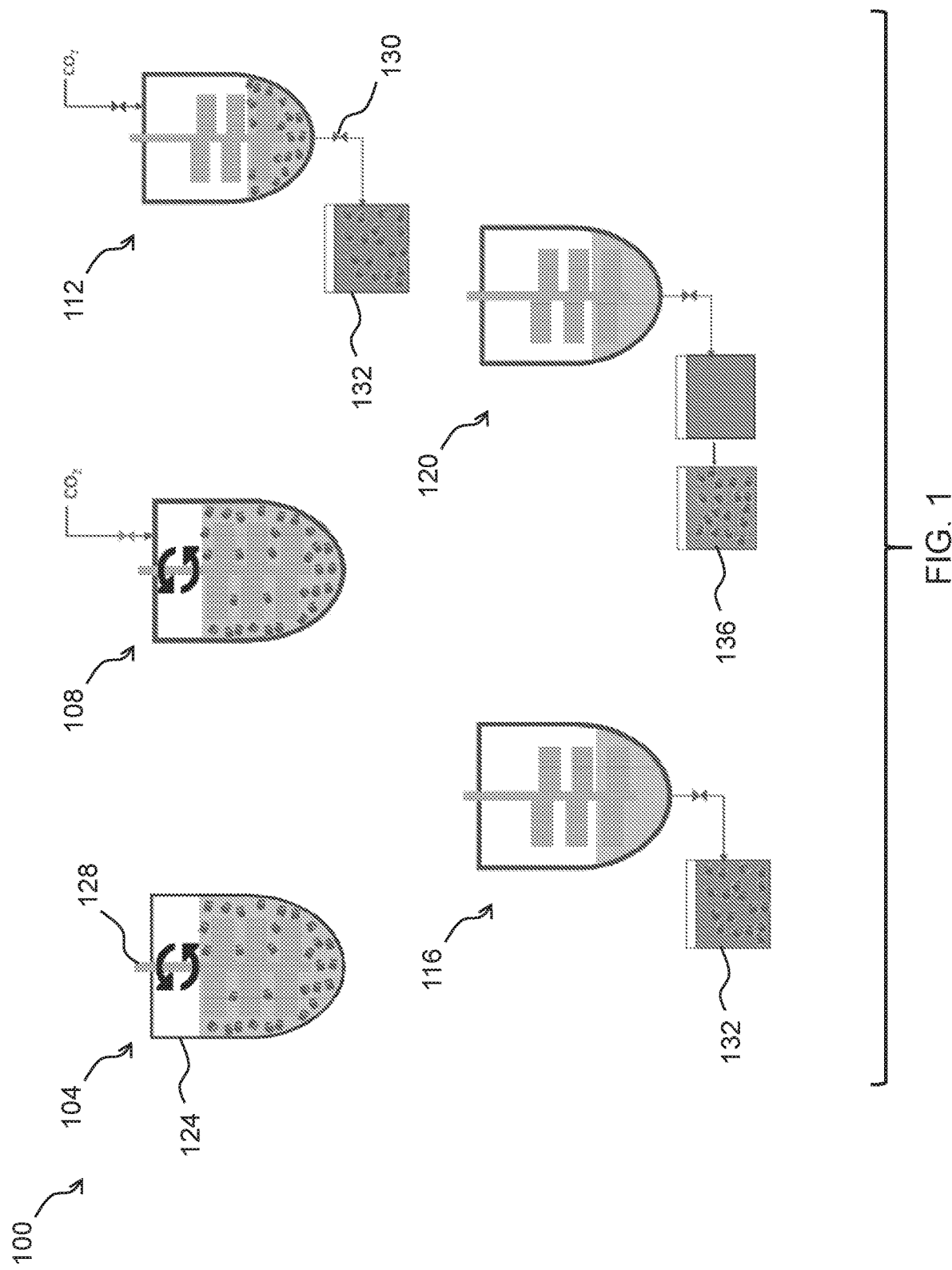
FIG. 1 is a is a diagram that illustrates an example of a system for manufacturing polymer foam beads according to aspects of the disclosure.

The present disclosure can be understood more readily by reference to the following detailed description of the disclosure and the Examples included therein. In various aspects, the present disclosure pertains to foamed polymer compositions and pellets including the polymer composition including: a matrix polymer component and from 0.01 wt % to 2 wt %, based on the weight of the pellets, of a nanostructured fluoropolymer, a nanostructured fluoropolymer encapsulated by an encapsulating polymer, or a combination thereof. The matrix polymer component includes polybutylene terephthalate (PBT), polyetherimide (PEI), polyethylene terephthalate (PET), polycarbonate (PC), poly(p-phenylene oxide) (PPO), polystyrene (PS), polyphenylene sulfide (PPS), polypropylene (PP), polyamide (PA), linear low-density polyethylene (LLDPE), low-density polyethylene (LDPE), high density polyethylene (HDPE), polytrimethylene terephthalate (PTT), polyethylene naphthalate (PEN), polybutylene naphthalate (PBN), copolymers thereof, or a combination thereof.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a nanostructured fluoropolymer" includes mixtures of two or more nanostructured fluoropolymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional additives" means that the additive can or cannot be included and that the description includes foamed compositions/foamed beads that both include and that do not include one or more additional additives.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$," can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "$M_w$," can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

The terms "BisA," "BPA," or "bisphenol A," which can be used interchangeably, as used herein refers to a compound having a structure represented by the formula:

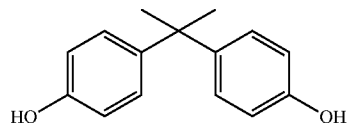 [SMILES: CC(C)(c1ccc(O)cc1)c1ccc(O)cc1]

BisA can also be referred to by the name 4,4-(propane-2,2-diyl)diphenol; p,p'-isopropylidenebisphenol; or 2,2-bis(4-hydroxyphenyl) propane. BisA has the CAS #80-05-7.

As used herein, "polycarbonate" refers to an oligomer or polymer including residues of one or more dihydroxy compounds, e.g., dihydroxy aromatic compounds, joined by carbonate linkages; it also encompasses homopolycarbonates, copolycarbonates, and (co) polyester carbonates.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Methods for Forming Foamed Beads

The present disclosure builds further on the use of a specially designed die for improving the nanostructuring of the fluoropolymer (e.g., PTFE) in a polymeric resin. This allows the preparation of masterbatches with high loadings of nanostructured fluoropolymer which can be diluted by the same base resin or with other resins.

The approach is to blend the nanostructured fluoropolymer masterbatch with a non-fluoropolymer containing polymer which can be the same base resin as used in the masterbatch with the same melt flow index (MFI) or a different MFI, or a miscible polymer (at least thermodynamically miscible with the matrix resin) to, e.g., lower or increase the glass transition temperature, or an immiscible resin. Foamed beads (polymer bead foams) can then be formed from the blend according to conventional polymer conversion processes such as but not limited to an extrusion process.

By varying the bead foaming conditions the extent of dispersion of the nanostructured fluoropolymer over the complete matrix can be modified, and the compositions including the fluoropolymer can be foamed.

At least the following situations can occur:
1. The nanostructured fluoropolymer is perfectly distributed in the matrix:
2. The nanostructured fluoropolymer-rich regions form the continuous phase and the nanostructured fluoropolymer-poor regions form the dispersed phase:
3. The nanostructured fluoropolymer-poor regions form the continuous phase and the nanostructured fluoropolymer-rich regions form the dispersed phase:
4. A co-continuous morphology of the nanostructured fluoropolymer-poor and the nanostructured fluoropolymer-rich regions is formed.

The nanostructured fluoropolymer-containing regions will have a different nucleation behavior to initiate the bead foam depending on the interaction of the nanostructured fluoropolymer with the chemical or physical blowing agent. It is known, e.g., from literature that PTFE can absorb high amounts of supercritical $CO_2$. Furthermore, the different melt strength can be controlled with the fluoropolymer concentration and the aspect ratio of the nanostructured fluoropolymer. As described, this is relevant for the control of the expansion of the foam beads.

Use of a non-random distribution of the nanostructured fluoropolymer regions with a different melt strength may lead to a multimodal (e.g., bimodal) cell size distribution irrespective of the resin composition for a wide range of bead foaming processes. Various possible cell size distributions could be generated using this blending approach.

One aspect that is different in comparison to studies using conventional fillers such as multiwalled carbon nanotubes (MWCNT) is the much higher aspect ratio of the nanostructured fluoropolymer filler. For the MWCNT filler the choice of the pristine CNT and the surface modification to get a reasonable dispersion within a polymer matrix are the primary parameters for the aspect ratio in the foam end product, mainly to limit the break-down process of the CNTs. For the nanostructured fluoropolymer/PTFE different processing parameters affect the aspect ratio.

The nanostructured PTFE can also act as a nucleating agent for the bead foaming process of the polymer matrix. The effectiveness of PTFE has already been demonstrated in polycarbonate matrix materials in U.S. Pat. No. 5,314,925, the disclosure of which is incorporated herein by this reference in its entirety. The PTFE can also act as a nucleating agent for the crystallization of the polymer matrix. For many polymers, epitaxial growth of polymer crystals on the PTFE has been observed. For bead foam applications, this may lead to desirable anisotropic foam properties of the final product.

Aspects of the disclosure thus relate to method for forming foamed beads, including:
saturating pellets with a blowing agent to form saturated pellets, the pellets including a matrix polymer component, and from 0.01 wt % to 2 wt %, based on the weight of the pellets, of a nanostructured fluoropolymer, a nanostructured fluoropolymer encapsulated by an encapsulating polymer, or a combination thereof; and
depressurizing the saturated pellets in a pressure vessel to form the foamed beads.

In some aspects the step of saturating the pellets with a blowing agent includes applying, by the pressure vessel, at least one of heat and pressure to the pellets to form the saturated pellets. The step of depressurizing the saturated pellets in a pressure vessel to form the foamed beads includes depressurizing the saturated pellets and heat treating the saturated pellets in a hot liquid bath. During forming the foamed beads, the blowing agent induces nucleation and expansion in the saturated pellets to form the foamed beads.

Referring to FIG. 1, a schematic diagram of a bead foaming process 100 that includes stages 104, 108, 112, 116 and 120 of a bead foaming system is shown. In FIG. 1, a first stage 104 includes forming a homogeneous dispersion of pellets in a liquid (e.g., dispersion medium). During the first stage, a mixer 128 of a pressure vessel 124 may be activated to mix the pellets, the dispersion medium, and, optionally, one or more surfactants to form the homogeneous dispersion.

A second stage 108 includes gas dissolution of a blowing agent in the pellets at a temperature lower than a glass transition temperature (Tg) of the matrix polymer component for the two-step process or near (e.g., slightly above, such as 1 to 10 percent above) the glass transition temperature (Tg) of the matrix polymer component for the one-step process. During the second stage, the blowing agent is absorbed by the pellets and saturated pellets are formed. A third stage 112 includes releasing the pressure, via an exit valve 130, of the pressure vessel 124 and collecting the saturated pellets in a first container 132, such as a bead storage tank or collection tank. Depressurization of the saturated pellets causes partial nucleation and degasification, i.e., the blowing agent in the saturated pellets expands and a portion of the blowing agent desorbs from the saturated pellets.

A fourth stage 116 includes heat treating, at the first container 132, the saturated pellets for a period of time at a particular temperature to induce post foaming in the saturated pellets to form foamed beads. As illustrated in FIG. 1, the fourth stage includes subjecting the saturated pellets to a heated fluid (e.g., water, oil, or a mixture) bath to induce post depressurization foaming. Exemplary oils include, but are not limited to, silicone oil, sunflower oil, olive oil and combinations thereof. In other implementations, the saturated pellets are not heat treated and the saturated pellets are further foamed or expanded during part formation and bead sintering by a formation system. In some such implementations, the saturated pellets can be subjected to a cold fluid bath to quench the saturated pellets which reduces or stops foaming. The fluid used for the cold fluid bath may be the same fluid or a different fluid as the fluid of the heated fluid bath. Exemplary fluids for dispersion fluids and the fluids of the fourth stage 116 may have a relatively low evaporation energy. Such low evaporation energy includes evaporation energies of less than or equal to 500 kilojoules per kilogram (KJ/kg) and may reduce or limit formation of a dense, non-foamed layer on the surface of the expanded bead. A fifth stage 120 includes stabilization of the foamed beads by cooling. As illustrated in FIG. 1, the fifth stage includes cooling the foamed beads in a chilled or room temperature fluid bath (e.g., in the first container 132 or a second container 136) to stop further nucleation and cell growth. The operations of FIG. 1 described above can be implemented in a batch, semi-batch, or a continuous manner. Continuous methods are often more desirable since they may allow for better process control and enable production of nano-cellular foamed beads.

Figure 2:
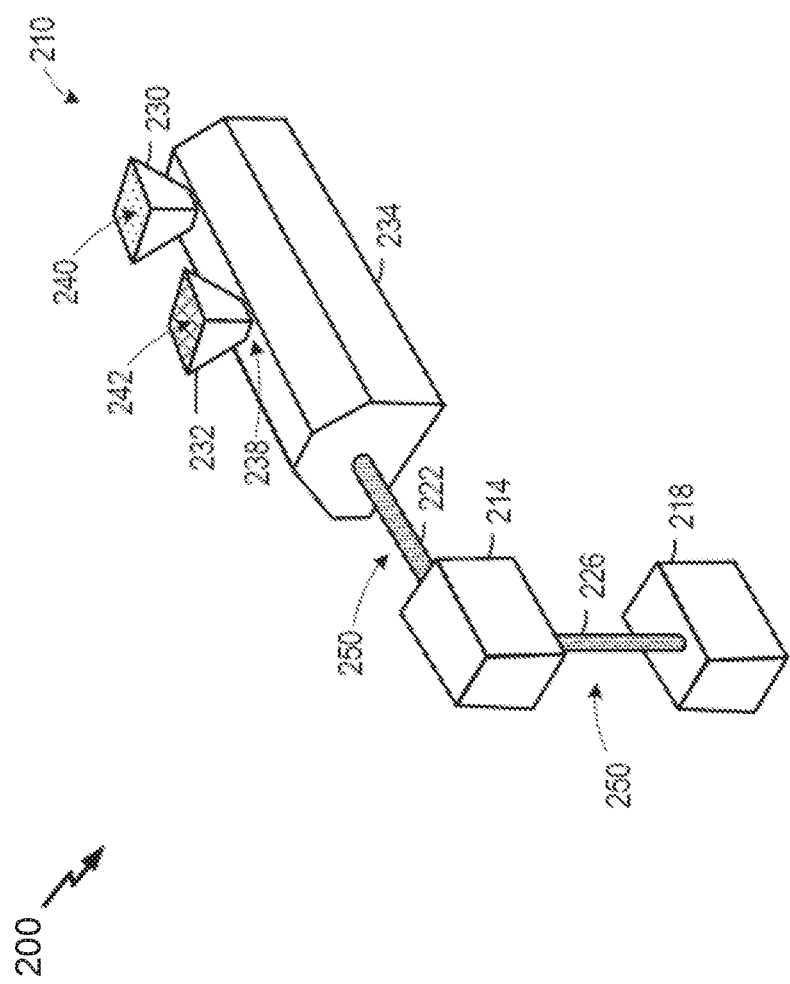
FIG. 2 is a diagram that illustrates a schematic view of an example of the system of FIG. 1

Referring to FIG. 2, an example of a system 200 for producing the extrudate and pellets formed therefrom is shown. System 200 is configured to use an extrusion process to form a polymer composition and to form extrudate from the polymer composition, as described herein. System 200 includes an extruder 210, an injector 214, and a die 218. Extruder 210 is coupled to injector 214 via one or more conduits 222, such as one or more tubes. Injector 214 is coupled to die 218 via one or more conduits 226, such as one or more tubes. System 200 may be controlled by a controller (not shown), such as a processor and/or blending controller.

Extruder 210 includes one or more hoppers, such as a first hopper 230 and a second hopper 232, and a barrel 234 coupled to the one or more hoppers. For example, barrel 234 may be coupled to a hopper via a feed throat 238. Each hopper 230, 232 is configured to receive material (e.g., pellets, granules, flakes, powders, and/or liquids) that is provided (e.g., gravity fed or force fed) from the hopper to barrel 234 via a corresponding feed throat 238. As shown, first hopper 230 has received a first material 240 and second hopper 232 has received a second material 242. First material 240 includes the matrix polymer component and nanostructured fluoropolymer, and second material 242 includes any additional component(s)/additive(s). In other aspects first material 240 includes the matrix polymer component, and second material 242 includes the nanostructured fluoropolymer and/or additional component(s)/additive(s). Although described as being provided to separate hoppers, in other implementations, first and second materials 240, 242 may be provided by the same hopper.

In some implementations, another material can be combined with first and second materials 240, 242 in the extruder 210. For example, the other material may be received by the extruder 210 via the one or more hoppers. The other material can include one or more additive such as those described herein. Each hopper 230, 232 provides its corresponding material 240, 242 into barrel 234 where the materials are combined to form a polymer composite 250 (e.g., a polymer composition or a blended composition). For example, the materials are gradually melted in barrel 234 by the mechanical energy (e.g., pressure) generated by turning screws, by heaters arranged along barrel 234, or both. The molten materials are mixed together (e.g., blended) to form polymer composite 250. Polymer composite 250 is provided from barrel 234 via conduit 222 to injector 214. Injector 214 injects polymer composite 250 into die 218 via conduit 226. Polymer composite 250 flows through the die 218 to form strands of extrudate (e.g., strands of polymer composite 250). The extruded polymer composite 250 can be cooled in a water bath, or by spraying the extrudate in a conduit 222 (e.g., a conveyor belt) as the extrudate moves from extruder 210 to a granulator via conduit 222. The granulator breaks the extrudate (e.g., the strands thereof) into pieces, such as pellets. The pellets of polymer composite 250 can then be used in a foaming process such as those described with reference to FIG. 1 and herein.

Further details relating to the methods of forming a foamed beads are provided in EP Application Serial No. 18214797.5, filed Dec. 20, 2018 and entitled "Micro, Sub-Micron, and/or Nano-Cellular Foams Based on Siloxane Containing (Co)polymers and Blends," the disclosure of which is incorporated herein by this reference in its entirety.

Suitable blowing agents include, but are not limited to, low boiling halohydrocarbons and those that generate carbon dioxide: blowing agents that are solid at room temperature and when heated to temperatures higher than their decomposition temperature, generate gases such as nitrogen, carbon dioxide ammonia gas, such as azodicarbonamide, metal salts of azodicarbonamide, 4,4' oxybis(benzenesulfonylhydrazide), sodium bicarbonate, ammonium carbonate, or the like, or combinations including at least one of the foregoing blowing agents. Blowing agents are generally used in amounts of 0.01 to 15 parts by weight, or about 0.01 to about 15 parts by weight, based on 100 parts by weight of the polymer portion of the composition.

In some aspects the matrix polymer component includes polybutylene terephthalate (PBT), polyetherimide (PEI), polyethylene terephthalate (PET), polycarbonate (PC), poly (p-phenylene oxide) (PPO), polystyrene (PS), polyphenylene sulfide (PPS), polypropylene (PP), polyamide (PA), linear low-density polyethylene (LLDPE), low-density polyethylene (LDPE), high density polyethylene (HDPE), polytrimethylene terephthalate (PTT), polyethylene naphthalate (PEN), polybutylene naphthalate (PBN), copolymers thereof, or a combination thereof.

In particular aspects the matrix polymer component includes PET, PEI, PPO, PS, PPS, PC, PP, PA, copolymers thereof, or a combination thereof. In specific aspects the matrix polymer component includes PET and PEI, including copolymers thereof. In further aspects the matrix polymer component includes PPO and PP, including copolymers thereof. In yet further aspects the matrix polymer component includes PPO and PA, including copolymers thereof. Exemplary polyamides include but are not limited to nylon, including any nylon blend (such as but not limited to nylon 6, nylon 6,6, nylon 6,12, nylon 11 and nylon 12).

In a specific aspect the foamed beads include from 1 wt % to 99 wt % PEI and from 1 wt % to 99 wt % PET. In further aspects the foamed beads include from 1 wt % to 20 wt % PEI and from 80 wt % to 99 wt % PET, or from 20 wt % to 80 wt % PEI and from 20 wt % to 80 wt % PET, or from 80 wt % to 99 wt % PEI and from 1 wt % to 20 wt % PET.

The foamed beads have in some aspects an average cell size of from 1 micron (μm) to 1000 μm, with the average cell size being determined according to conventional methods. In particular aspects the foamed polymer composition has an average cell size of from 5 to 800 μm, from 5 to 600 μm, from 5 to 400 μm, from 5 to 200 μm, or from 5 to 100 μm.

In certain aspects the fluoropolymer includes polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination thereof.

The encapsulating polymer includes in some aspects a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof.

In a particular aspect the fluoropolymer includes polytetrafluoroethylene (PTFE). In further aspects the fluoropolymer encapsulated by an encapsulating polymer is styrene-acrylonitrile copolymer (SAN)-encapsulated PTFE, also known as TSAN.

As is known, fluoropolymers are available in a variety of forms, including powders, emulsions, dispersions, agglomerations, and the like. "Dispersion" (also called "emulsion") fluoropolymers are generally manufactured by dispersion or emulsion, and generally include about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers may be made by coagulation and drying of dispersion-manufactured fluoropolymers. Fine powder fluoropolymers are generally manufactured to have a particle size of approximately 400 to 500 microns. "Granular" fluoropolymers may be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

In one aspect the fluoropolymer is at least partially encapsulated by an encapsulating polymer that may be the same or different as the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, ABS resins, polyethersulfones, poly(alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations including at least one of the foregoing polymers.

Particularly preferred encapsulating polymers include a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof. Styrene-acrylonitrile copolymer encapsulated polytetrafluoroethylene is one preferred aspect.

The encapsulating polymers may be obtained by polymerization of monomers or mixtures of monomers by methods known in the art, for example, condensation, addition polymerization, and the like. Emulsion polymerization, particularly radical polymerization may be used effectively. In one aspect, the encapsulating polymer is formed from monovinylaromatic monomers containing condensed aromatic ring structures, such as vinyl naphthalene, vinyl anthracene and the like. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations including at least one of the foregoing compounds. Styrene and/or alpha-methylstyrene may be specifically mentioned.

Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, and glycidyl (meth)acrylates. Other examples include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations including at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt %, or up to about 100 wt %, of monovinyl aromatic monomer, specifically 30 to 100 wt %, or about 30 to about 100 wt %, more specifically, 50 to 90 wt %, or about 50 to about 90 wt % monovinylaromatic monomer, with the balance being comonomer(s). A preferred fluoropolymer is TSAN, which includes SAN and PTFE. See, U.S. Pat. Nos. 5,804,654 and 6,040,370, the disclosures of which are incorporated herein by this reference in their entireties.

Elastomers may also be used as the encapsulating polymer, as well as elastomer-modified graft copolymers. Suitable elastomers include, for example, conjugated diene rubbers: copolymers of a conjugated diene with less than about 50 wt % of a copolymerizable monomer: olefin rubbers such as ethylene propylene copolymers (EPR) or ethylene-propylene-diene monomer rubbers (EPDM): ethylene-vinyl acetate rubbers: silicone rubbers: elastomeric C1-8 alkyl (meth)acrylates: elastomeric copolymers of C1-8 alkyl (meth)acrylates with butadiene and/or styrene: or combinations including at least one of the foregoing elastomers.

Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene: 1,3-and 2,4-hexadienes, and the like, as well as mixtures including at least one of the foregoing conjugated diene monomers. Specific conjugated diene homopolymers include polybutadiene and polyisoprene.

Copolymers of a conjugated diene rubbers may also be used, for example those produced by aqueous radical emulsion polymerization of a conjugated diene and up to 10 wt %, or up to about 10 wt %, of one or more monomers copolymerizable therewith Specific copolymers include styrene and acrylonitrile.

(Meth)acrylate monomers suitable for use as an elastomeric encapsulating monomer include the cross-linked, particulate emulsion homopolymers or copolymers of C4-8 alkyl (meth)acrylates, in particular C4-6 alkyl acrylates, for example n-butyl acrylate, t-butyl acrylate, n-propyl acrylate, isopropyl acrylate, 2-ethylhexyl acrylate, and the like, and combinations including at least one of the foregoing monomers. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures including at least one of the foregoing comonomomers. Optionally, up to 5 wt % a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations including at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide 5 to 95 wt %, or about 5 to about 95 wt %, of the total graft copolymer, more specifically, 20 to 90 wt %, about 20 to about 90 wt %, and even more specifically, 40 to 85 wt %, or about 40 to about 85 wt % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly(alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly(propyl methacrylate), poly(butyl methacrylate): polybutadiene, copolymers of polybutadiene with propylene, poly(vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly(C4-8 alkyl acrylate) rubbers, styrene-butadiene rubbers (SBR), EPDM rubbers, silicon rubber and combinations including at least one of the foregoing encapsulating polymers.

In another aspect, the encapsulating polymer includes SAN, ABS copolymers, alpha-(C1-3)alkyl-styrene-acrylonitrile copolymers, alpha-methylstyrene-acrylonitrile (AM-SAN) copolymers, SBR, and combinations including at least one of the foregoing. In yet another aspect the encapsulating polymer is SAN or AMSAN.

Suitable amounts amount of encapsulating polymer may be determined by one of ordinary skill in the art without undue experimentation, using the guidance provided below. In one aspect, the encapsulated fluoropolymer includes 10 to 90 weight percent (wt %), or about 10 to about 90 wt % fluoropolymer and 90 to 10 wt %, or about 90 to about 10 wt %, of the encapsulating polymer, based on the total weight of the encapsulated fluoropolymer. Alternatively, the encapsulated fluoropolymer includes 20 to 80 wt %, or about 20 to about 80 wt %, more specifically, 40 to 60 wt %, or about 40 to about 60 wt % fluoropolymer, and 80 to 20 wt %, or about 80 to about 20 wt %, specifically, 60 to 40 wt %, or about 60 to about 40 wt % encapsulating polymer, based on the total weight of the encapsulated polymer.

As described herein, the fluoropolymer is nanostructured. As used herein, the term "nanostructure" refers to a material in which one dimension of the material is equal to or less than 1000 nm (e.g., one dimension is 1 to 1000 nm in size). In a particular aspect, the nanostructure includes at least two dimensions that are equal to or less than 1000 nm (e.g., a first dimension is 1 to 1000 nm in size and a second dimension is 1 to 1000 nm in size). In another aspect, the nanostructure includes three dimensions that are equal to or less than 1000 nm (e.g., a first dimension is 1 to 1000 nm in size, a second dimension is 1 to 1000 nm in size, and a third dimension is 1 to 1000 nm in size). The shape of the nanostructure can be of a wire, a particle (e.g., having a substantially spherical shape), a rod, a tetrapod, a hyper-branched structure, a tube, a cube, or mixtures thereof. The nanostructures can be monodisperse, where all particles are of the same size with little variation, or polydisperse, where the particles have a range of sizes and are averaged.

The nanostructured fluoropolymer can be prepared in a masterbatch, for example, during extrusion of a polymer, a filler, or both simultaneously. Methods for the preparation of the nanostructured fluoropolymer are described on WO 2018/122747, the disclosure of which is incorporated herein by this reference in its entirety. Thus in some aspects the fluoropolymer is fibrillated. "Fibrillation" is a term of art that refers to the treatment of fluoropolymers so as to produce, for example, a "node and fibril," network, or cage-like structure. In one aspect, the fluoropolymer includes fibrils having an average diameter of 5 nanometers (nm) to 2 micrometers (μm), or from about 5 nm to about 2μm. The fluoropolymer may also have an average fibril diameter of 30 nanometers to 750 nanometers, more specifically 5 nanometers to 500 nanometers. In a further example, the fluoropolymer may also have an average fibril diameter of about 30 nanometers to about 750 nanometers, more specifically about 5 nanometers to about 500 nanometers. Field Emission Scanning Electron Microscopy can be employed to observe the extent of fibrillation of the fluoropolymer throughout the matrix polymer in the fibrillated compositions.

In some aspects the foamed beads include from 0.01 wt % to less than 0.1 wt %, based on the weight of the pellets, of the nanostructured fluoropolymer, the nanostructured fluoropolymer encapsulated by an encapsulating polymer, or the combination thereof. In further aspects the nanostructured fluoropolymer, the nanostructured fluoropolymer encapsulated by an encapsulating polymer, or the combination thereof are present in the foamed beads in an amount of from 0.01 wt % to 0.5 wt %, or from 0.01 wt % to 0.09 wt %, or from 0.03 wt % to 0.10 wt %, or from 0.03 wt % to 0.09 wt %, or from 0.05 wt % to 0.10 wt %, or from 0.05 wt % to 0.09 wt %.

The foamed beads may further include in some aspects at least one additional additive including a reinforcing filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof. The at least one additional additive may be included in the foamed beads in any amount that will not significantly adversely affect the desired properties of the foamed beads.

In a particular aspect the at least one additional additive is a flame retardant. Suitable flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P-O$, wherein each G is independently an alkyl, cycloalkyl, aryl, alkaryl, or aralkyl group, provided that at least one G is an aromatic group. Two of the G groups may be joined together to provide a cyclic group, for example, diphenyl pentaerythritol diphosphate, which is described by Axelrod in U.S. Pat. No. 4,154,775. Other suitable aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like. Thus, in particular aspects the retardant is a phosphorous-based flame retardant.

Articles Including the Foamed Beads

Aspects of the disclosure further relate to articles including the foamed beads described herein. Exemplary articles include, but are not limited to, film, tape, breads, strands, sheets, tubes and rods. The article may have any cross section, including but not limited to circular, square, polygonal and annular.

In particular aspects the article is a component of an aircraft, including but not limited to an interior or an exterior component of an aircraft. Examples of aircraft include, but are not limited to, jets, small aircraft, helicopters and spacecraft. Example interior components include, but are not limited to, foldout trays on the rear of a passenger aircraft seat, seat filling, intermediate wall filling, and interior doors. Example exterior components include, but are not limited to, filling for the outer skin of the aircraft, the aircraft nose, the wings, the outer doors, rudders and rotor blades.

Various combinations of elements of this disclosure are encompassed by this disclosure, e.g., combinations of elements from dependent claims that depend upon the same independent claim.

ASPECTS OF THE DISCLOSURE

In various aspects, the present disclosure pertains to and includes at least the following aspects.

Aspect 1. A method for forming a polymer bead foam, comprising, consisting of, or consisting essentially of:
saturating pellets with a blowing agent to form saturated pellets, the pellets comprising
a matrix polymer component, and
from 0.01 wt % to 2 wt %, based on the weight of the pellets, of a nanostructured fluoropolymer, a nanostructured fluoropolymer encapsulated by an encapsulating polymer, or a combination thereof; and
forming foamed beads from the saturated pellets by combining, in a pressure vessel, the pellets and the blowing agent.

Aspect 2. The method according to Aspect 1, wherein saturating the pellets with a blowing agent comprises applying, by the pressure vessel, at least one of heat and pressure to the mixture to form the saturated pellets, and
wherein forming the foamed beads comprises depressurizing the saturated pellets and heat treating the saturated pellets in a hot liquid bath, wherein, during forming the foamed beads, the blowing agent induces nucleation and expansion in the saturated pellets to form the foamed beads.

Aspect 3. The method according to Aspect 1 or 2, wherein the matrix polymer component comprises polybutylene terephthalate (PBT), polyetherimide (PEI), polyethylene terephthalate (PET), polycarbonate (PC), poly(p-phenylene oxide) (PPO), polystyrene (PS), polyphenylene sulfide (PPS), polypropylene (PP), polyamide (PA), linear low-density polyethylene (LLDPE), low-density polyethylene (LDPE), high density polyethylene (HDPE), polytrimethylene terephthalate (PTT), polyethylene naphthalate (PEN), polybutylene naphthalate (PBN), copolymers thereof, or a combination thereof.

Aspect 4. The method according to any of Aspects 1 to 3, wherein the matrix polymer component comprises PET, PEI, PPO, PS, PPS, PC, PP, PA, copolymers thereof, or a combination thereof.

Aspect 5. The method according to any of Aspects 1 to 4, wherein the foamed composition has an average cell size of from 1 micron (μm) to 1000 μm.

Aspect 6. The method according to any of Aspects 1 to 5, wherein the matrix polymer component comprises from 1 wt % to 99 wt % PEI and from 1 wt % to 99 wt % PET.

Aspect 7. The method according to any of Aspects 1 to 6, wherein the fluoropolymer comprises polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination thereof.

Aspect 8. The method according to any of Aspects 1 to 7, wherein the encapsulating polymer comprises a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof.

Aspect 9. The method according to any of Aspects 1 to 8, wherein the fluoropolymer comprises polytetrafluoroethylene.

Aspect 10. The method according to any of Aspects 1 to 9, wherein the fluoropolymer encapsulated by an encapsulating polymer is styrene-acrylonitrile copolymer encapsulated polytetrafluoroethylene.

Aspect 11. The method according to any of Aspects 1 to 10, comprising from 0.01 wt % to less than 0.1 wt %, based on the weight of the pellets, of the nanostructured fluoropolymer, the nanostructured fluoropolymer encapsulated by an encapsulating polymer, or the combination thereof.

Aspect 12. The method according to any of Aspects 1 to 11, wherein the composition further comprises at least one additional additive comprising a reinforcing filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof.

Aspect 13. The method according to Aspect 12, wherein the at least one additional additive comprises a flame retardant, and the flame retardant is a phosphorous-based flame retardant.

Aspect 14. An article comprising the polymer bead foam formed according to the method of any of Aspects 1 to 13.

Aspect 15. The article according to Aspect 14, wherein the article is a component of an aircraft, including but not limited to an interior component or an exterior component of an aircraft.

Aspect 16. A method for forming foamed beads, comprising, consisting of, or consisting essentially of:
saturating pellets with a blowing agent to form saturated pellets, the pellets comprising
a matrix polymer component, and
from 0.01 wt % to 2 wt %, based on the weight of the pellets, of a nanostructured fluoropolymer, a nanostructured fluoropolymer encapsulated by an encapsulating polymer, or a combination thereof; and depressurizing the saturated pellets in a pressure vessel to form the foamed beads.

Aspect 17. The method according to Aspect 16, wherein saturating the pellets with a blowing agent comprises applying, by the pressure vessel, at least one of heat and pressure to the pellets to form the saturated pellets, and
wherein depressurizing the saturated pellets in a pressure vessel to form the foamed beads comprises depressurizing the saturated pellets and heat treating the saturated pellets in a hot liquid bath, wherein, during forming the foamed beads, the blowing agent induces nucleation and expansion in the saturated pellets to form the foamed beads.

Aspect 18. The method according to Aspect 16 or 17, wherein the matrix polymer component comprises polybutylene terephthalate (PBT), polyetherimide (PEI), polyethylene terephthalate (PET), polycarbonate (PC), poly(p-phenylene oxide) (PPO), polystyrene (PS), polyphenylene sulfide (PPS), polypropylene (PP), polyamide (PA), linear low-density polyethylene (LLDPE), low-density polyethylene (LDPE), high density polyethylene (HDPE), polytrimethylene terephthalate (PTT), polyethylene naphthalate (PEN), polybutylene naphthalate (PBN), copolymers thereof, or a combination thereof.

Aspect 19. The method according to Aspect 16 or 17, wherein the matrix polymer component comprises polybutylene terephthalate (PBT), polyetherimide (PEI), polyethylene terephthalate (PET), polycarbonate (PC), poly(p-phenylene oxide) (PPO), polystyrene (PS), polyphenylene sulfide (PPS), polypropylene (PP), polyamide (PA), polytrimethylene terephthalate (PTT), polyethylene naphthalate (PEN), polybutylene naphthalate (PBN), copolymers thereof, or a combination thereof.

Aspect 20. The method according to any of Aspects 16 to 19, wherein the matrix polymer component comprises PET, PEI, PPO, PS, PPS, PC, PP, PA, copolymers thereof, or a combination thereof.

Aspect 21. The method according to any of Aspects 16 to 19, wherein the matrix polymer component comprises PET, PEI, PPO, PS, PPS, PC, PA, copolymers thereof, or a combination thereof.

Aspect 22. The method according to any of Aspects 16 to 21, wherein the foamed beads have an average cell size of from 1 micron (μm) to 1000 μm.

Aspect 23. The method according to any of Aspects 16 to 22, wherein the matrix polymer component comprises from 1 wt % to 99 wt % PEI and from 1 wt % to 99 wt % PET.

Aspect 24. The method according to any of Aspects 16 to 23, wherein the fluoropolymer comprises polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, ethylene chlorotrifluoroethylene, or a combination thereof.

Aspect 25. The method according to any of Aspects 16 to 24, wherein the encapsulating polymer comprises a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, or a combination thereof.

Aspect 26. The method according to any of Aspects 16 to 25, wherein the fluoropolymer comprises polytetrafluoroethylene.

Aspect 27. The method according to any of Aspects 16 to 26, wherein the fluoropolymer encapsulated by an encapsulating polymer is styrene-acrylonitrile copolymer encapsulated polytetrafluoroethylene.

Aspect 28. The method according to any of Aspects 16 to 27, comprising from 0.01 wt % to less than 0.1 wt %, based on the weight of the pellets, of the nanostructured fluoropolymer, the nanostructured fluoropolymer encapsulated by an encapsulating polymer, or the combination thereof.

Aspect 29. The method according to any of Aspects 16 to 28, wherein foamed beads further comprise at least one additional additive comprising a reinforcing filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof.

Aspect 30. The method according to any of Aspects 16 to 29, wherein the nanostructured fluoropolymer is fibrillated.

Aspect 31. An article comprising the foamed beads formed according to the method of any of Aspects 16 to 30, wherein the article is a component of an aircraft.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Several polymer base compositions including various matrix polymer components and SAN/PTFE were injection molded according to conventional methods. The base compositions are set forth in Table 1:

TABLE 1

| SAN/PTFE Base Compositions | | | | | | | |
|---|---|---|---|---|---|---|---|
| | | 1 | 2 | 3 | 4 | 5 | 6 |
| PBT 315 (SABIC), Mw 100000 g/mol, PS standard | wt % | 49.94 | 48.94 | 39.94 | | | |
| PBT 195 (SABIC), Mw 60000 g/mol, PS standard | wt % | 50 | 50 | 50 | | | |

TABLE 1-continued

| SAN/PTFE Base Compositions | | | | | | | |
|---|---|---|---|---|---|---|---|
| | | 1 | 2 | 3 | 4 | 5 | 6 |
| PP 595A (SABIC) MFI 47 at 230° C. and 2.16 kg | wt % | | | | 90 | | |
| Ramapet ® N180 PET (0.8 IV) (Indorama Ventures PLC) | wt % | | | | | 94 | |
| TSAN (SABIC) | wt % | | 1 | 10 | 10 | 6 | |
| Irganox 1010 (BASF) | wt % | 0.06 | 0.06 | 0.06 | | 0.06 | 0.06 |
| % PTFE | | 0 | 0.5 | 5 | 5 | 3 | 0 |

IV = Intrinsic Viscosity, MFI = Melt Flow Index

Compositions 1 and 6 did not include SAN/PTFE and are considered comparative compositions. The SAN/PTFE was an encapsulated nanostructured fluoropolymer (n-structured TSAN) masterbatch in either PBT or PP (depending on the respective base composition), manufactured as described in WO2018122747, the disclosure of which is incorporated by this reference in its entirety.

The base compositions were extruded using the barrel temperatures set forth in Table 2:

TABLE 2

| Barrel Temperatures for Extruding the Base Compositions |
|---|
| PP  70/100/150/200/240/240/240/240/240/240/240/240° C. |
| PBT 70/150/200/250/280/280/280/280/280/280/280/280° C. |

While the following examples relate to foam compositions formed from conventional core-back and extrusion foaming methods, these compositions could also be formed as bead foams according to the methods described herein. The resulting analysis is expected to be the same.

The base compositions were foamed with nitrogen gas using a conventional core-back injection molding process. Various PP foamed samples were formed from pellets of base composition 4 according to specifications set forth in Table 3:

TABLE 3

| Foamed PP Samples | | |
|---|---|---|
| Sample No. | TSAN Content (wt %) | Form of Sample |
| C3.1 | 0 | Solid (no foam) |
| C3.2 | 0 | Foamed |
| C3.3 | 0 | Foamed |
| C3.4 | 1 | Solid (no foam) |
| Ex.3.1 | 1 | Foamed |
| Ex.3.2 | 1 | Foamed |
| Ex.3.3 | 1 | Foamed |
| Ex.3.4 | 1 | Foamed |
| C3.5 | 2 | Solid (no foam) |
| Ex3.5 | 2 | Foamed |
| Ex3.6 | 2 | Foamed |
| Ex3.7 | 2 | Foamed |
| Ex3.8 | 2 | Foamed |

Figure 3B:
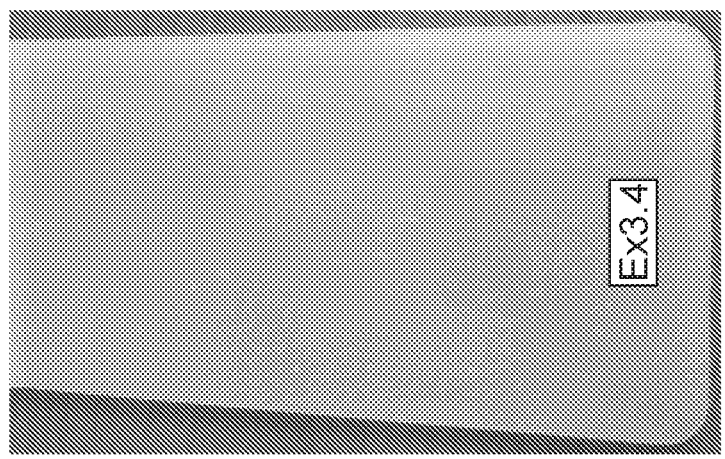
FIGS. 3A-3E are images of comparative polypropylene compositions and example polypropylene polymer compositions formed according to aspects of the disclosure.
Figure 3A:
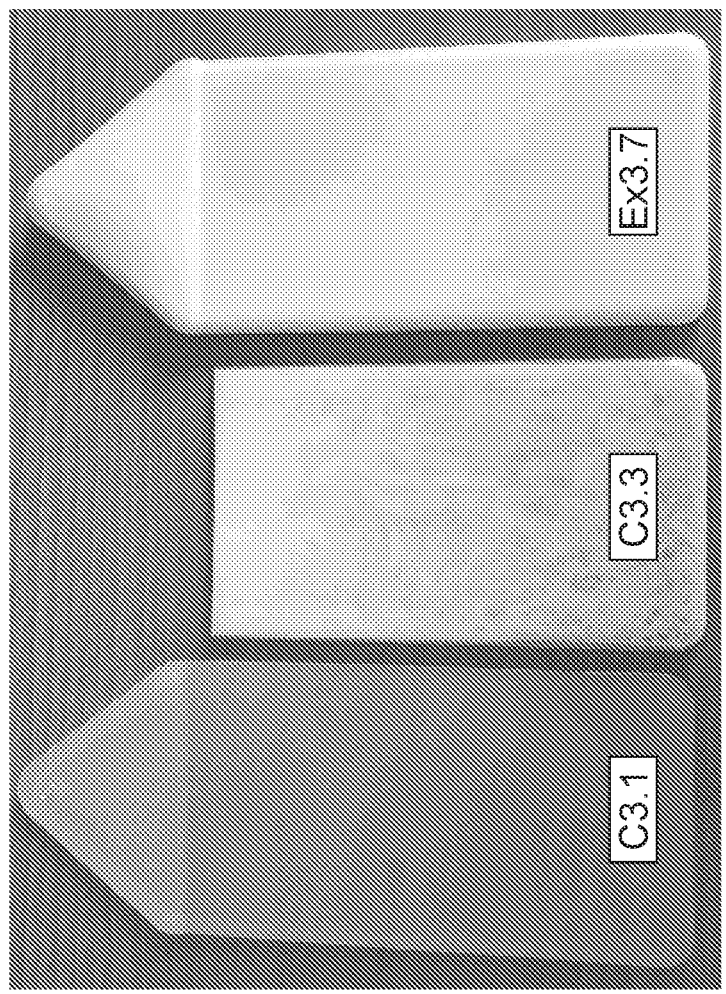
Figure 3C:
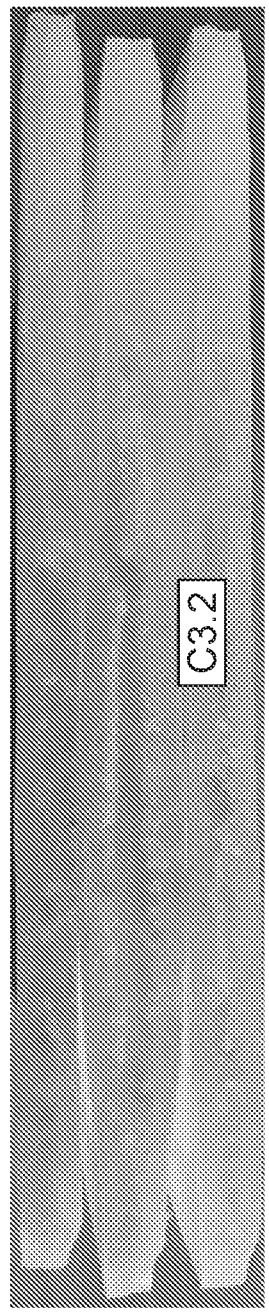
Figure 3E:
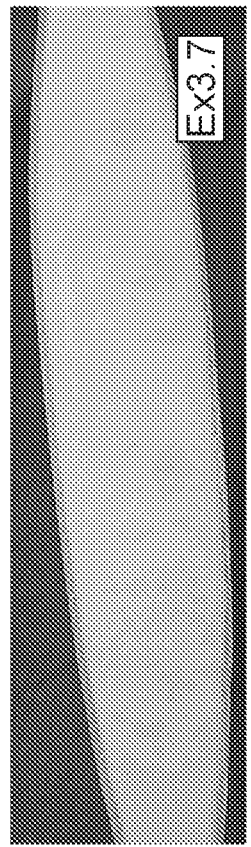
Figure 3D:
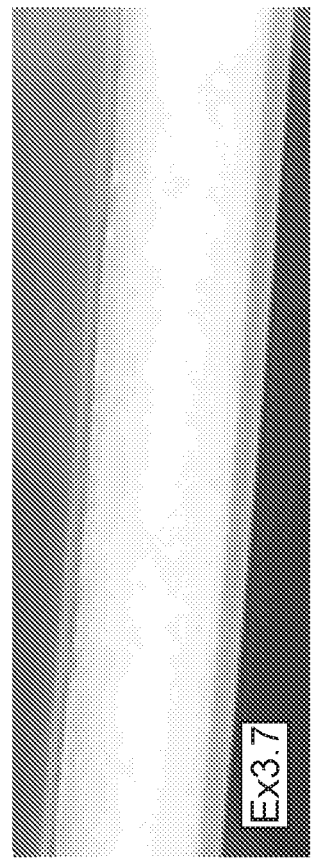

Photographs of several of the samples are shown in FIGS. 3A-3E. FIG. 3B showing foamed sample Ex3.4 with 1 wt % TSAN exhibits some aggregated PTFE domains. From the samples the following observations were made:

The neat PP foamed samples (C3.2 and C3.3) exhibited an inhomogeneous foam structure in both the thickness direction and in the foam direction.

PP can be foamed by including up to 2 wt % TSAN.

Addition of TSAN results in a much more homogeneous cell size distribution in the foamed core.

The amount of TSAN in the samples can be substantially reduced as compared to previously known compositions.

Figure 4:
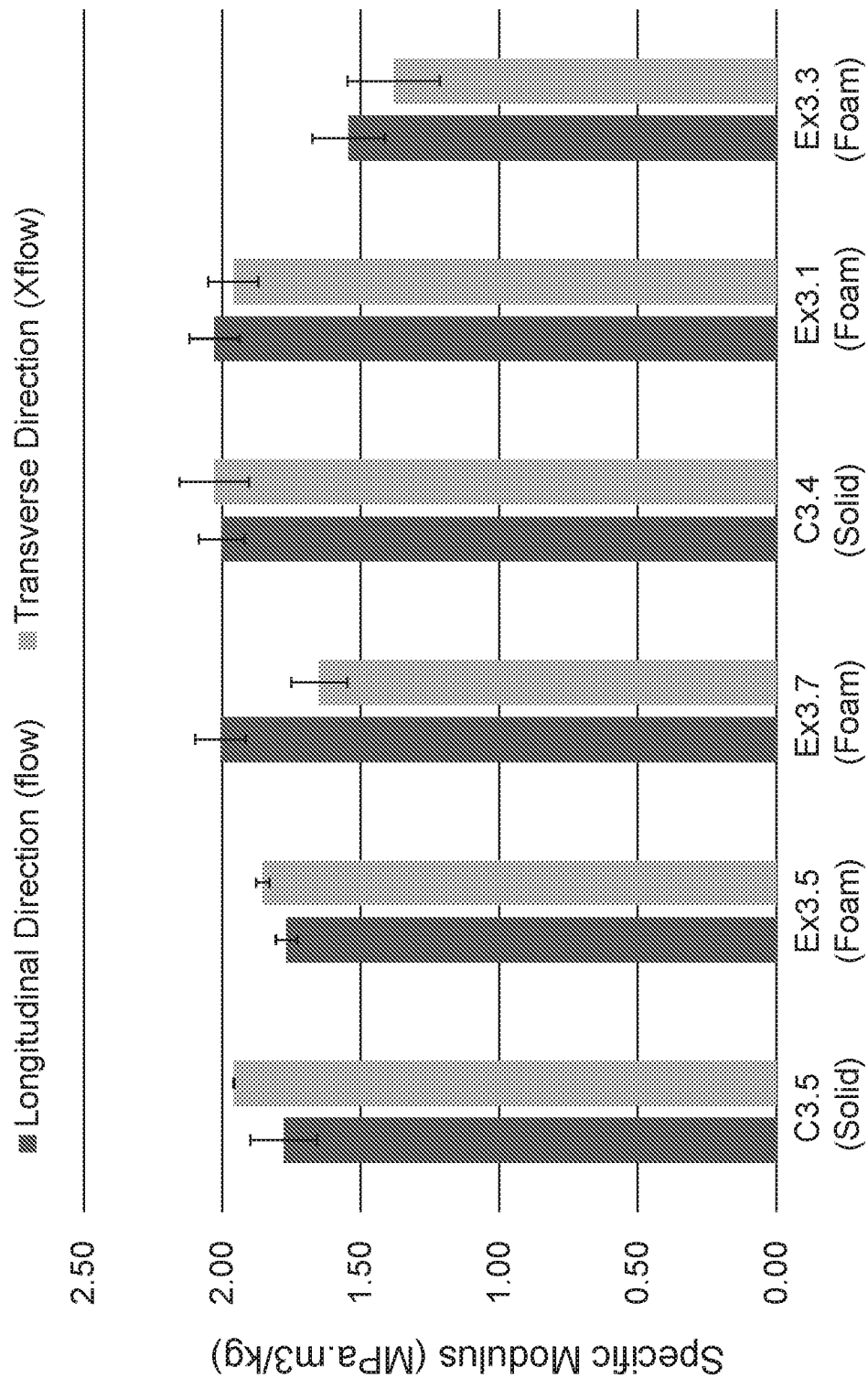
FIG. 4 is a graph showing the modulus properties of comparative polypropylene compositions and example polypropylene polymer compositions formed according to aspects of the disclosure.
Figure 5:
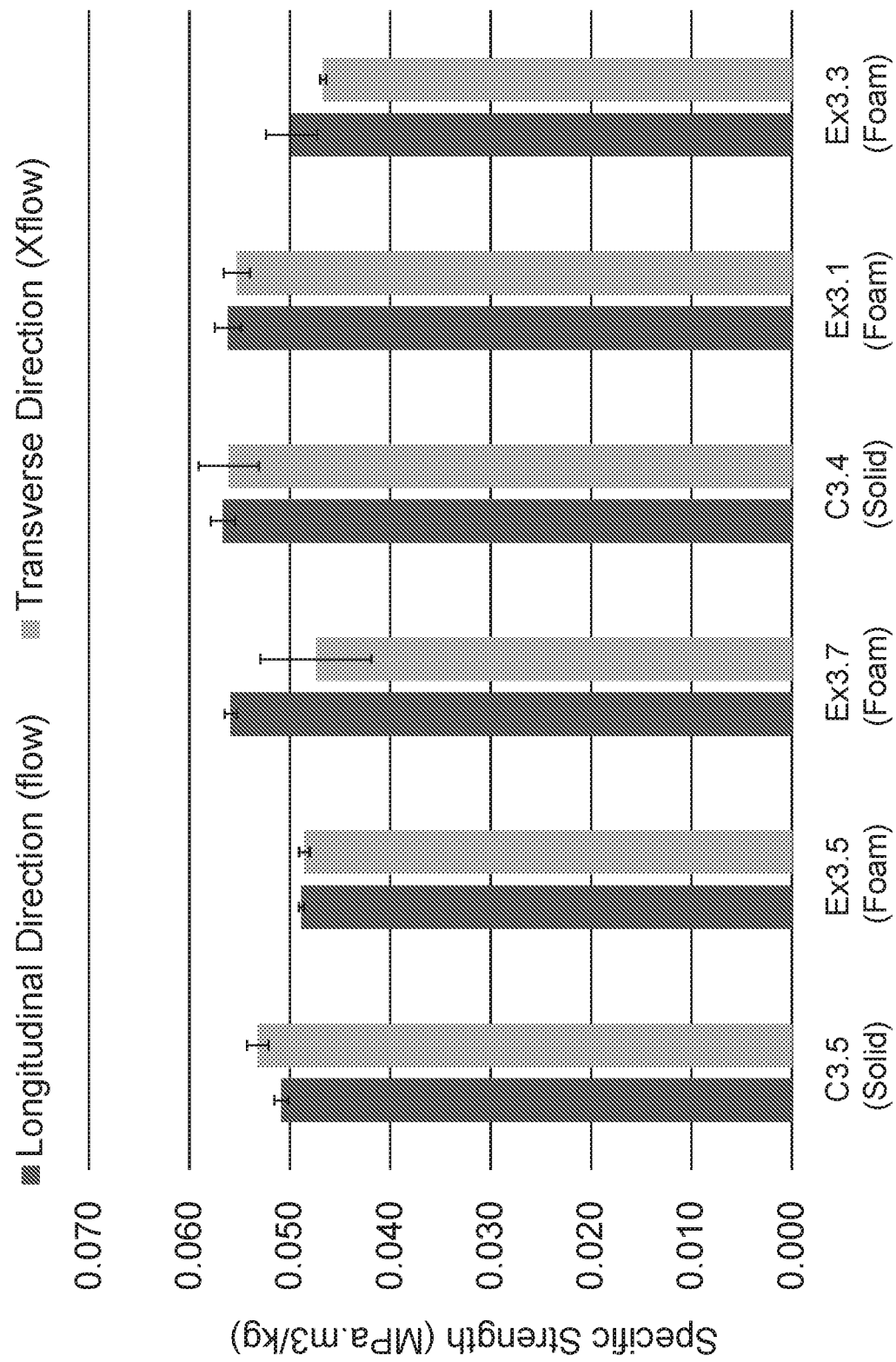
FIG. 5 is a graph showing the strength properties of comparative polypropylene compositions and example polypropylene polymer compositions formed according to aspects of the disclosure.

The tensile modulus and strength of the samples were determined according to ISO 527. Results are illustrated in FIGS. 4 and 5. From the graphs it is observed that the foamed samples including TSAN do not suffer from a significant loss in modulus and strength as compared to the solid samples.

Various PBT foamed samples were formed from pellets of base compositions 2 and 3 according to specifications set forth in Table 3:

TABLE 4

| Foamed PBT Samples | | |
|---|---|---|
| Sample No. | TSAN Content (wt %) | Form of Sample |
| C4.1 | 0 | Solid (no foam) |
| C4.2 | 0 | Foamed |
| C4.3 | 0 | Foamed |
| C4.4 | 1 | Solid (no foam) |
| Ex.4.1 | 1 | Foamed |
| Ex.4.2 | 1 | Foamed |
| Ex4.3 | 1 | Foamed |
| Ex4.4 | 1 | Foamed |

Figure 6A:
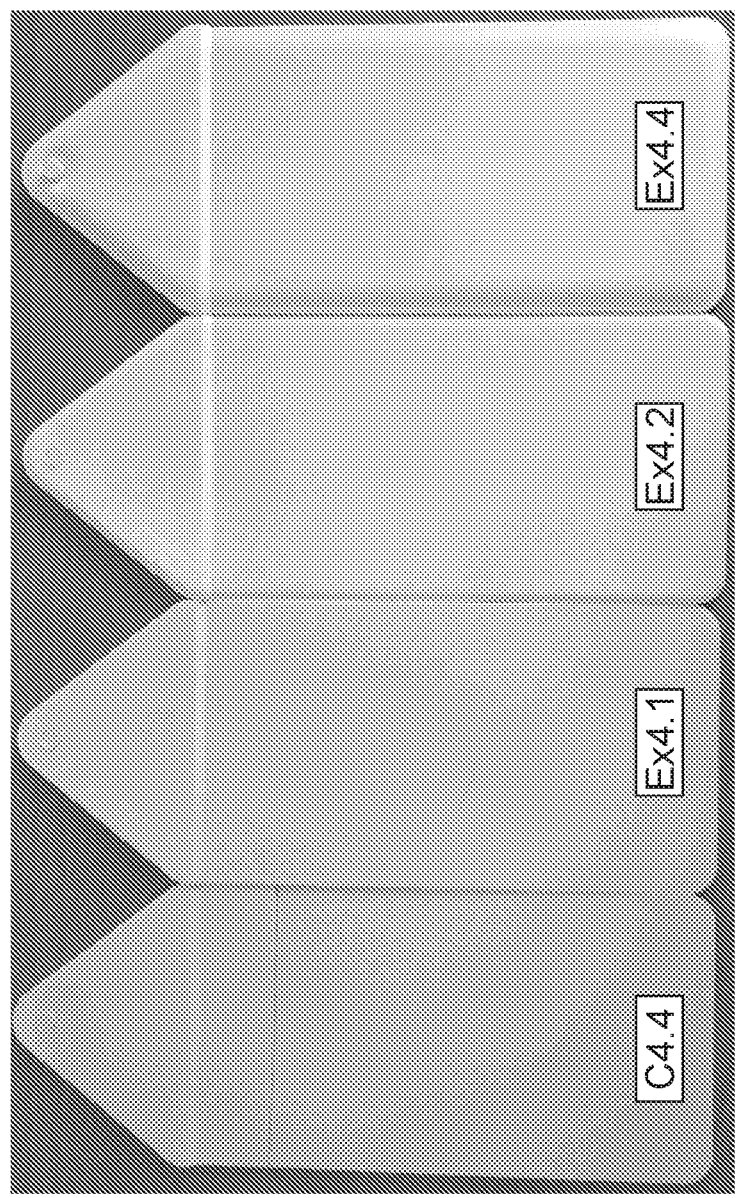

Photographs of several of the samples are shown in FIGS. 6A-6D. FIG. 6C showing foamed sample C4.3 (no TSAN) demonstrates a large gradient in cell sizes. From the samples the following observations were made:

PBT can be foamed by including up to 1 wt % TSAN.

The melt temperature profile was more sensitive for PBT than for PP and the processing window was smaller.

A strong flow-induced crystallization effect was observed, which may consequences (either positive or negative) for thin parts or thin runner sections.

Figure 7A:
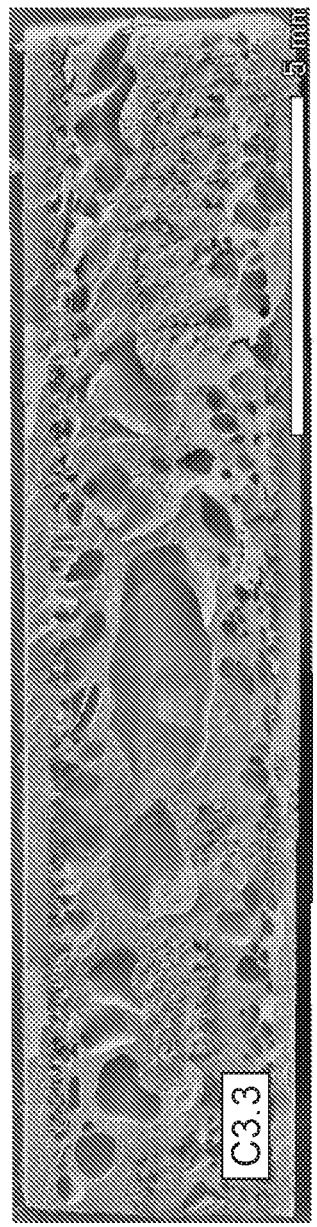
FIGS. 7A and 7B are cross-sectional scanning electron microscopy (SEM) images of foamed polypropylene compositions including a comparative sample (FIG. 7A) and a sample formed according to aspects of the disclosure (FIG. 7B).
Figure 7B:
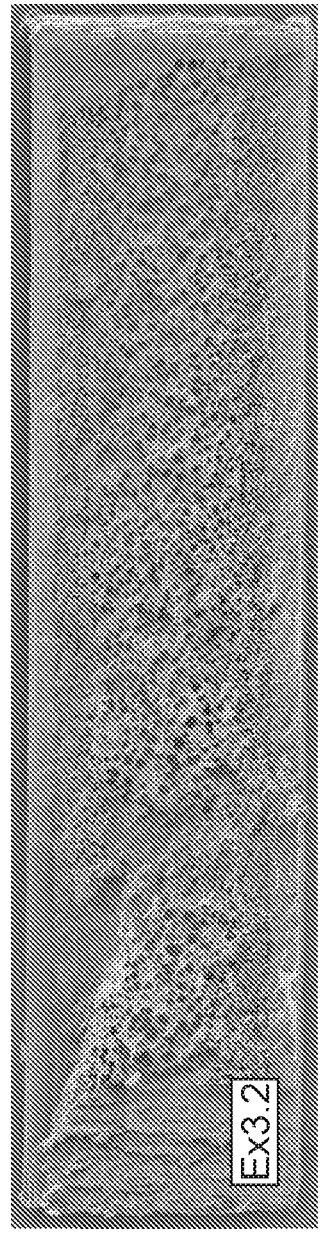

Cross-sectional scanning electron microscopy (SEM) images of PP foamed samples are shown in FIGS. 7A (Sample C3.3) and 7B (Sample Ex3.2). The images show that the foamed sample that does not include TSAN (FIG. 7A) includes an inhomogeneous foam structure in both the thickness direction and in the flow direction, while the sample including TSAN (FIG. 7B) had a homogeneous cell size distribution throughout the foamed core.

Figure 8:
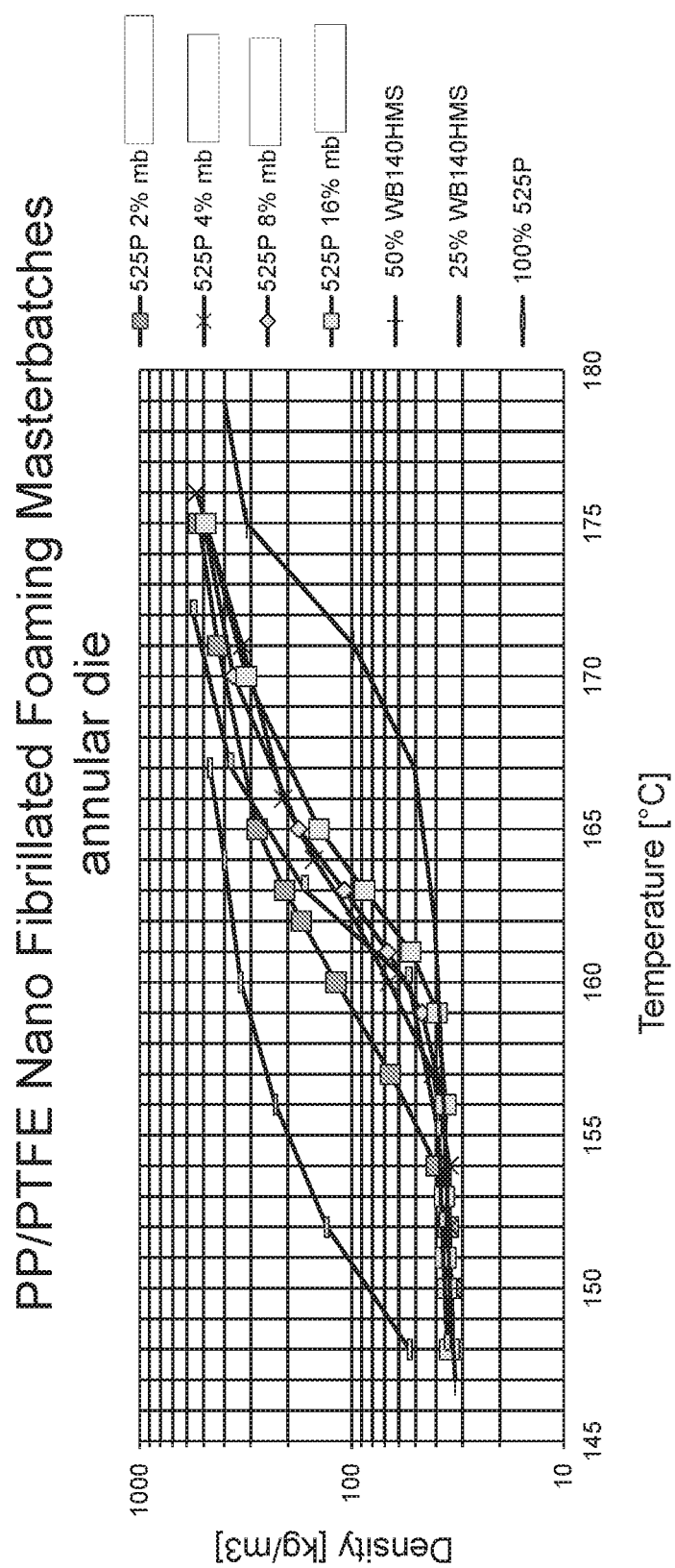
FIG. 8 is a graph showing density vs. temperature for various comparative compositions and example compositions formed according to aspects of the disclosure.

Additional foamed PP samples were formed from a 3 wt % TSAN masterbatch composition. The PP was PP 525P from SABIC, which has a MFI of 3. The samples were foamed using isobutane with an annular die. 2, 4, 8 and 16 wt % of the masterbatch composition was combined with neat PP to form the foamed samples (i.e., the final TSAN content of the foamed samples was 0.06 wt %, 0.12 wt %, 0.24 wt % and 0.48 wt %, respectively), and the density of the foamed samples was determined. The final PTFE content of the foamed samples was 0.03 wt %, 0.06 wt %, 0.12 wt % and 0.24 wt %, respectively. In addition, comparative foam samples including neat PP foam (100% 525P) and blends of PP with a high melt strength PP (Daploy™ WB140HMS) were formed. The density of all samples as a function of temperature is shown in FIG. 8. From the graph it is observed that by adding TSAN to the PP density is minimized and the processing window increases.

Figure 9:
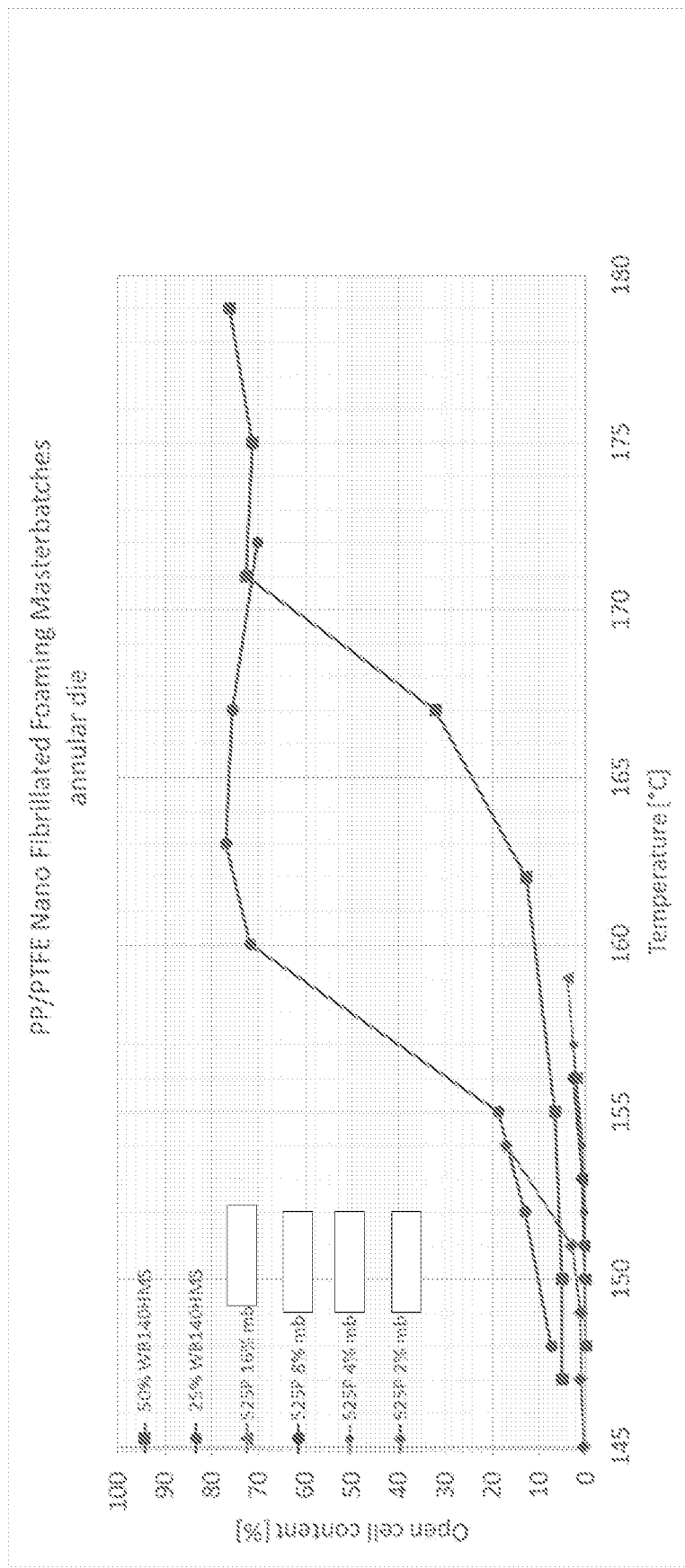
FIG. 9 is a graph showing open cell content vs. temperature for various comparative compositions and example compositions formed according to aspects of the disclosure.

Open cell content of the samples as a function of temperature is shown in FIG. 9. As observed, the PP/TSAN foamed samples had substantially no open cell content over a wide temperature range.

Figure 10B:
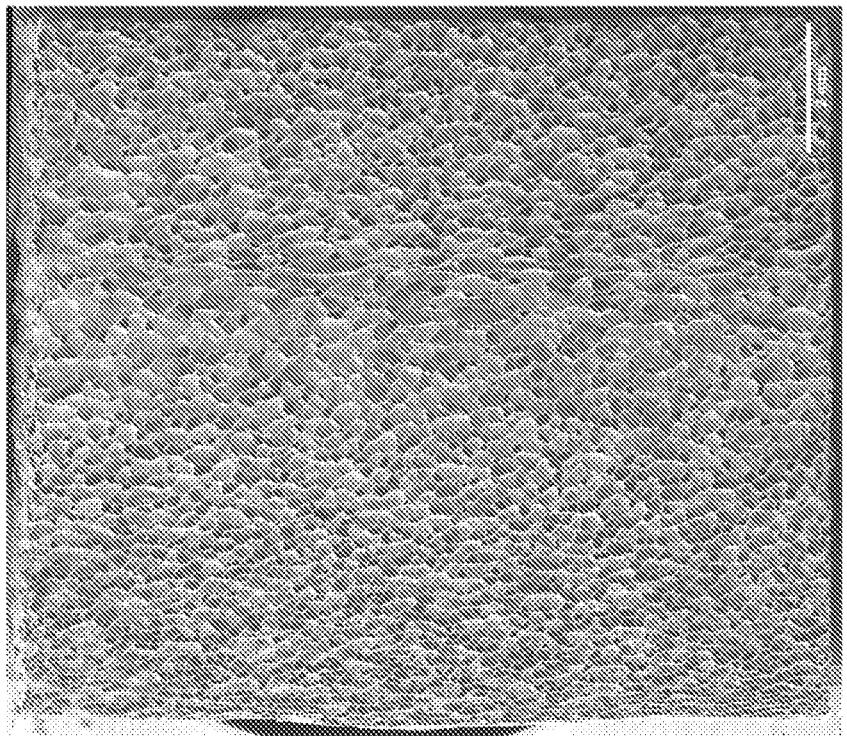
FIGS. 10A and 10B are images of polyethylene terephthalate (PET) foams formed according to aspects of the disclosure.
Figure 10A:
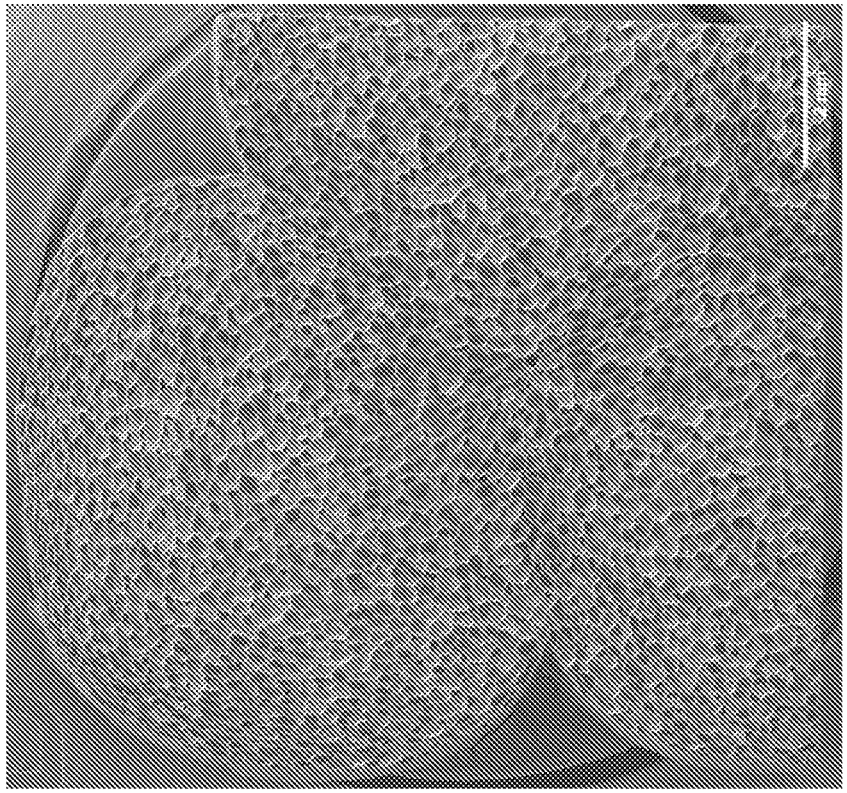

Images of PET foams formed according to aspects of the disclosure are shown in FIGS. 10A and 10B. The images are cross sections of PET including 0.045 wt % SAN/PTFE. The images illustrate the closed cell content of the samples.

Foam compositions including a blend of matrix polymer component were formed as shown in Table 5:

The PPC was a polyphthalatecarbonate (50:50 molar ratio of isophthalate ester to terephthalate ester). LEXAN™ 4501 with a MFR at 300° C./5 kg of 10 g/10 min (measured in accordance with ISO 1133).

Polyetherimide foam compositions were formed according to Table 6:

TABLE 6

| PEI (ULTEM™) Compositions | | | | |
|---|---|---|---|---|
| Composition | | C6 | Ex6.1 | Ex6.2 |
| Ultem™ 2000-1000 | wt % | 80 | 80 | 80 |
| 3% nanostructured TSAN in Ramapet ® N180 | wt % | | 1.5 | 3 |
| Ramapet ® N180 PET (0.8 IV) | wt % | 19.5 | 18.5 | 17 |
| Talc | wt % | 0.5 | | |
| % PTFE | | 0 | 0.0225 | 0.045 |
| MVR (300° C./5 kg) | | 5.3 | 5.3 | 5.4 |
| Tg (° C.) | | 174 | 171 | 171 |

The compositions of Table 6 were formed according to the conditions of Table 7:

TABLE 7

| Extrusion conditions | | |
|---|---|---|
| Throat | 80% Ultem | 15% PET |
| Side feeder | 5% TSAN MB | (1.25 kg) |
| % PTFE | 0.075 fed at the 300° C. zone | |
| Barrel settings (° C.): 60-270-340-320-310-300-300-300-300-300 | | |
| Torque: 71-78% | | |
| Output: 15 kg/h | | |

Additional blended compositions including PET (Ramapet® N180) and PEI (Ultem™) were formed and tested as set forth in Table 8 below:

TABLE 5

| Polymer Blend Compositions | | | | | | | |
|---|---|---|---|---|---|---|---|
| Compositions | | C5.1 | Ex5.1 | C5.2 | Ex5.2 | Ex5.3 | Ex5.4 | C5.3 |
| Ramapet ® N180 PET (0.8 IV) (Indorama Ventures PLC) | wt % | | | 80 | 40 | 60 | | |
| PPC (SABIC) | wt % | 20 | 80 | | | | | |
| 3% TSAN/PTFE in Ramapet ® N180 | wt % | | | | 40 | 40 | 100 | |
| 6% TSAN/PTFE in Ramapet ® N180 | wt % | 80 | 20 | | | | | 100 |
| Ultem 1010 (SABIC) | wt % | | | 20 | 20 | | | |
| % PTFE | | 2.4 | 0.6 | 0 | 0.6 | 0.6 | 1.5 | 3.0 |
| Properties | | | | | | | | |
| HDT ISO 75Af | | 132 | | 84 | 83 | 71 | 70 | 73 |
| Vicat B120 (° C.) | | 165 | | 96 | 96 | 147 | 140 | 164 |
| Tensile Modulus (Mpa) | | 2425 | | 2667 | 2729 | 2708 | 2852 | 3037 |
| Yield Stress (Mpa) | | 69.9 | | 70.2 | 70.0 | 63.5 | | |
| Yield Strain (%) | | 6.6 | | 4.5 | 4.4 | 4 | | |
| Elongation (%) | | 74 | | 199 | 76 | 57 | 0.9 | 0.5 |
| Tg 1 (° C.) | | 85.8 | 85.8 | 92.1 | 92.7 | | 78.8 | 78.1 |
| Tg 2 (° C.) | | 162.0 | 141.2 | | | | | |

TABLE 8

PET/PEI Blends

|  |  | C8.1 | Ex8.1 | Ex8.2 | Ex8.3 | Ex8.4 | C8.2 | Ex8.5 | Ex8.6 |
|---|---|---|---|---|---|---|---|---|---|
| Throat: |  |  |  |  |  |  |  |  |  |
| Ramapet ® N180 | wt % | 40 | 40 | 40 | 40 | 40 | 10 | 10 | 10 |
| Ground Ramapet ® N180 | wt % |  |  |  |  |  | 9.35 | 9.85 | 9.85 |
| Ground Ultem ™ 1010 (SABIC) | wt % | 20 | 20 | 20 | 20 | 20 | 20 | 20 | 20 |
| Irganox 1010 (BASF) | wt % |  |  |  |  |  | 0.15 | 0.15 | 0.15 |
| Exolit ® OP1240 (Clariant) | wt % |  |  |  |  |  | 15 | 15 | 15 |
| Melapur ® 200-70 (BASF) | wt % |  |  |  |  |  | 5 | 5 | 5 |
| TSAN (SABIC) | wt % |  |  |  |  |  | 0.5 |  |  |
| Side Feeder: |  |  |  |  |  |  |  |  |  |
| 3% nanostructured TSAN in Ramapet ® N180 | wt % |  | 1.5 | 3.33 | 6.67 | 16.7 |  | 16.7 | 3.33 |
| Ramapet ® N180 | wt % | 40 | 38.5 | 36.67 | 33.33 | 23.3 | 40 | 23.3 | 36.67 |
| % PTFE |  | 0 | 0.023 | 0.05 | 0.10 | .025 | 0 | 0.25 | 0.05 |
| Properties: |  |  |  |  |  |  |  |  |  |
| MVR (280 ° C., 1.2 kg) |  | 15.8 | 16.2 | 17.2 | 18.6 | 20.9 | 16.8 | 26.5 | 50.1 |
| Tg | ° C. | 97 | 92 | 92 | 92 | 94 | 90 | 89 | 93.5 |
| Tm (1) | ° C. | 246 | 240 | 240 | 240 | 251 | 174 | 174 | 175 |
| Tm (2) | ° C. |  |  | 246 | 246 | 246 |  | 183 | 183 | 183 |
| Tm (3) | ° C. |  |  |  |  |  | 241 | 241 | 240 |
| Tm (4) | ° C. |  |  |  |  |  |  |  | 246 |
| Granulate appearance |  | TP | TP | TP, C | H, C | TL, C | BG | BG | BG |

TP = Transparent; TL = Translucent; C = Chunks; H = Hazy; BG = Brittle grey

The compositions in Table 8 were extruded with barrel settings (in ° C.) of 60-270-340-320-300-280-280-280-280 at an extrusion rate of 20 kg/hr. In the granulate appearance "chunks" refers to clusters or lumps of badly dispersed TSAN particles.

Figure 11:
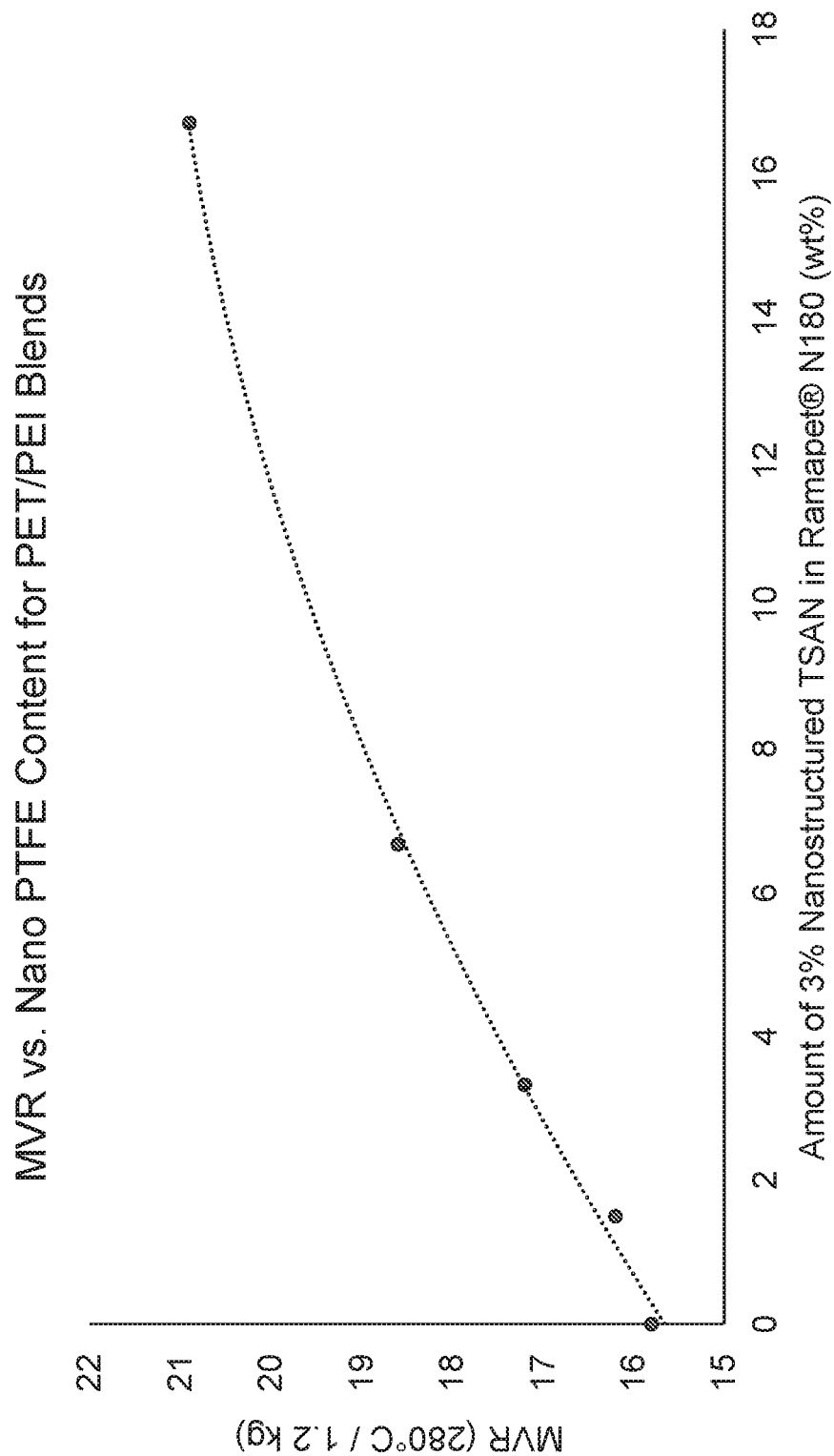
FIG. 11 is a graph showing MVR vs. TSAN content (3% nanostructured TSAN in Ramapet® N180) for various comparative compositions and example compositions formed according to aspects of the disclosure.

A graph of MVR vs. TSAN content (3% nanostructured TSAN in Ramapet® N180) is provided in FIG. 11. As shown, increasing the amount of TSAN allows for very high flow (MVR); and from Table 8 it is observed that there is no a significant change in Tg. This demonstrates the efficiency of TSAN in its nanostructured form.

Further blended compositions including PET (Ramapet® N180) and PEI (Ultem™) were formed and tested as set forth in Table 9 below:

TABLE 9

PET/PEI Blends

|  |  | C9.1 | C9.2 | C9.3 | C9.4 | C9.5 | C9.6 |
|---|---|---|---|---|---|---|---|
| Throat: |  |  |  |  |  |  |  |
| Ramapet ® N180 | wt % | 10 | 10 | 10 | 10 | 10 | 10 |
| Ground Ramapet ® N180 | wt % | 50 | 49 | 45 | 40 | 25 |  |
| Ground Ultem ™ 1010 (SABIC) | wt % |  | 1 | 5 | 10 | 25 | 50 |
| Side Feeder: |  |  |  |  |  |  |  |
| Ramapet ® N180 | wt % | 40 | 40 | 40 | 40 | 40 | 40 |
| MVR (260° C./1.2 kg) |  | 14.8 | 14.4 | 13.6 | 12.3 | 8.8 | 2.9 |
| MVR (280° C./1.2 kg) |  |  |  | 30.7 | 23.3 | 17.2 | 7.1 |
| Tg | ° C. | 80 | 83 | 89 | 92 | 99 | 126 |
| calculated Tg (Fox) | ° C. | 80 | 81 | 85 | 90 | 106 | 136 |
| Tm | ° C. | 248 | 246 | 246 | 246 | 246 | 246 |
| Tc | ° C. |  |  |  |  | 177 |  |
| Granulate appearance |  | TP, C | TP, C | TP, Y* | TP, Y | TP, Y | TL, Y |

TP = Transparent; TL = Translucent; CL = Clear; Y = Yellow (Y* = slightly yellow)

The compositions in Table 9 were extruded with barrel settings (in ° C.) of 60-270-340-320-300-280-280-280-280 at an extrusion rate of 20 kg/hr.

The compositions in Table 9 do not include PTFE, but from the evaluated Tg properties it is observed that Tg can be tuned by blending PEI and PET. Pure PEI (e.g., Ultem™) cannot be processed at temperatures below the melting point of PTFE (330° C.). Addition of PET lowers the Tg significantly. Even at a 50/50 mix the Tg is reduced by about 90° C. Over the range the melting temperature (Tm) is fairly constant just below 250° C. This makes a processing temperature between 28° and 310° C. possible. In contrast, pure PEI begins to be processable at 360° C., with typical processing conditions between 36° and 400° C. In combination with the results from Table 8, it is observed that addition of PTFE does not strongly influence Tg.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:

1. A method for forming foamed beads, comprising:
    saturating pellets with a blowing agent to form saturated pellets, the pellets comprising a matrix polymer component comprising polyetherimide (PEI), poly(p-phenylene oxide) (PPO), or a combination thereof, and from 0.01 wt % to 0.05 wt %, based on the weight of the pellets, of a nanostructured polytetrafluoroethylene; and
    depressurizing the saturated pellets in a pressure vessel to form the foamed beads,
    wherein the nanostructured polytetrafluoroethylene has one dimension that is equal to or less than 1000 nanometers (nm),
    wherein the foamed beads have a transparent granulate appearance, and
    when the foamed beads include chunks or do not include chunks.

2. The method according to claim 1, wherein saturating the pellets with a blowing agent comprises applying, by the pressure vessel, at least one of heat and pressure to the pellets to form the saturated pellets, and
    wherein depressurizing the saturated pellets in a pressure vessel to form the foamed beads comprises depressurizing the saturated pellets and heat treating the saturated pellets in a hot liquid bath, wherein, during forming the foamed beads, the blowing agent induces nucleation and expansion in the saturated pellets to form the foamed beads.

3. The method according to claim 1, wherein the matrix polymer component further comprises polyethylene terephthalate (PET), polystyrene (PS), or a combination thereof.

4. The method according to claim 1, wherein the foamed beads have an average cell size of from 1 micron (μm) to 1000 μm.

5. The method according to claim 1, wherein the matrix polymer component comprises from 1 wt % to 99 wt % PEI and from 1 wt % to 99 wt % PET.

6. The method according to claim 1, wherein foamed beads further comprise at least one additional additive comprising a reinforcing filler, acid scavenger, anti-drip agent, antioxidant, antistatic agent, chain extender, colorant, flow promoter, lubricant, mold release agent, plasticizer, quenching agent, flame retardant, UV reflecting additive, and combinations thereof.

7. The method according to claim 1, wherein the nanostructured polytetrafluoroethylene is fibrillated.

8. An article comprising the foamed beads formed according to the method of claim 1, wherein the article is a component of an aircraft.

* * * * *